(12) United States Patent
Weinstein et al.

(10) Patent No.: US 7,904,368 B2
(45) Date of Patent: Mar. 8, 2011

(54) PORTFOLIO CONFIRMATION AND CERTIFICATION PLATFORM

(75) Inventors: Seth I. Weinstein, Weston, CT (US); Kenneth L. Grant, Briarcliff Manor, NY (US)

(73) Assignee: Morgan Stanley Fund Services, Inc., Purchase, NY (US)

( * ) Notice: Subject to any disclaimer, the term of this patent is extended or adjusted under 35 U.S.C. 154(b) by 0 days.

(21) Appl. No.: 12/817,021

(22) Filed: Jun. 16, 2010

(65) Prior Publication Data

US 2010/0250467 A1 Sep. 30, 2010

Related U.S. Application Data

(63) Continuation of application No. 12/624,197, filed on Nov. 23, 2009.

(51) Int. Cl.
*G06Q 40/00* (2006.01)

(52) U.S. Cl. .................................................. 705/36 R
(58) Field of Classification Search ............... 705/35–45
See application file for complete search history.

(56) References Cited

U.S. PATENT DOCUMENTS

| 7,509,274 | B2 | 3/2009 | Kam et al. |
| 7,574,399 | B2 | 8/2009 | Weber et al. |
| 7,580,880 | B2 | 8/2009 | Meyerhoff, II |
| 7,689,494 | B2 | 3/2010 | Torre et al. |
| 7,689,501 | B1 | 3/2010 | Gastineau et al. |
| 2001/0042037 | A1 | 11/2001 | Kam et al. |
| 2002/0019803 | A1 | 2/2002 | Muller |
| 2002/0138387 | A1 | 9/2002 | Griffin |
| 2004/0117286 | A1 | 6/2004 | Charnley, Jr. |
| 2004/0225595 | A1 | 11/2004 | Nolan, III |
| 2005/0131798 | A1 | 6/2005 | Eisler et al. |
| 2006/0106715 | A1 | 5/2006 | Furrer |
| 2007/0022025 | A1 | 1/2007 | Litman et al. |
| 2007/0294158 | A1 | 12/2007 | Patel et al. |
| 2008/0005002 | A1 | 1/2008 | Ferris |
| 2008/0301035 | A1 | 12/2008 | Mercier et al. |
| 2009/0024543 | A1 | 1/2009 | Horowitz et al. |
| 2009/0265279 | A1 | 10/2009 | Mintz et al. |
| 2009/0313178 | A1 | 12/2009 | Weber et al. |
| 2009/0327158 | A1 | 12/2009 | Freund |
| 2010/0063908 | A1 | 3/2010 | Racanelli et al. |
| 2010/0070429 | A1 * | 3/2010 | Spurgin et al. ............ 705/36 R |

FOREIGN PATENT DOCUMENTS

| WO | WO 00/46708 A1 | 8/2000 |
| WO | WO 0046707 A1 * | 8/2000 |
| WO | WO 2008151295 A2 | 11/2008 |
| WO | WO 2009009593 A1 | 1/2009 |
| WO | WO 2009079424 A1 | 6/2009 |

* cited by examiner

*Primary Examiner* — Thomas M Hammond, III
(74) *Attorney, Agent, or Firm* — Weitzman Law Offices, LLC (57) ABSTRACT

A system and method for confirmation of hedge fund information, comprising performing an asset/liability confirmation by comparing corroborating data received from a third party independent of the hedge fund to a list of hedge fund assets/liabilities to identify third party confirmed assets/liabilities that correspond to the corroborating data. A price input confirmation is performed to identify a fund-provided value of an asset/liability as a confirmed value when it substantially corresponds a third party value of each asset/liability. Assigning a unique identifier to a confirmation instance and associated the unique identifier to a report identifying the proportion of the fund's NAV attributable to the total value of third party confirmed assets/liabilities and attributable to the total confirmed value of assets/liabilities. A second report identifying generated risk and/or performance data includes the unique identifier to certify that the asset/liability and price input confirmations have been performed.

10 Claims, 7 Drawing Sheets

201 Asset Confirmation and Qualification
202 Asset Risk Analysis
203 Asset Return and Relative Returns
204 Sensitivity Analysis
205 Parallel Shock Analysis
206 Stress Test Analysis
207 Value at Risk Analysis
208 Return Attribution
209 Profit and Loss Analysis /w Time Series
210 Concentration Analysis

PORTFOLIO CONFIRMATION AND CERTIFICATION PLATFORM

CROSS-REFERENCE TO RELATED APPLICATION

This application is a continuation of U.S. patent application Ser. No. 12/624,197, entitled "PORTFOLIO CONFIRMATION AND CERTIFICATION PLATFORM," filed Nov. 23, 2009, which is incorporated herein by reference.

BACKGROUND

1. Field

This disclosure relates generally to financial reporting and, more specifically, to a specialized computing system and computer-implemented method for confirmation and certification of information reported by a hedge fund to its investors.

2. Background

Recent events in the hedge fund market have highlighted a substantial shortcoming in the manner in which investors allocate capital to hedge funds.

Specifically, investors often allocate capital without a great deal of transparency into the manner in which a fund's net asset value ("NAV") is computed or the characteristics of which the assets are held. Recent economic instability, increased incidents of fraud, historic levels of investment losses and investor withdrawals, suspension of redemptions by some of the industry's largest players, and the demise of multiple hedge fund entities have all contributed to the call for greater transparency.

Hedge funds generally control the amount and type of information they share with investors. They must balance the amount and type of information disclosed to investors against their justifiable desire to protect proprietary information regarding the funds' investment strategy. In the current state, investors may receive investor balance statements and very little else, and this information may be inadequate to support the basis of informed investment decisions. Additionally, in some cases there is no independent party involved in the computation of the fund's NAV. In other cases, funds rely on an external administrator to produce the NAV. The result is a gap between the information investors need to make informed decisions and the information available.

While some measures have been taken to alleviate this gap, it is believed that each is in some way deficient. Some hedge funds have turned to external administrators and outsourced their reporting functions. However, there are no licensing requirements for external administrators in the United States, there are no set processes for their reporting methods and, most importantly, the external administrators themselves may rely in some part on the fund for information used in calculating the NAV. In other words, notwithstanding the role of the administrator, investors still lack an understanding of how the NAV was calculated and the source of the data relied upon in the calculations performed.

Annual external auditing functions are generally effective in determining the accuracy of transactions, but fail to contemplate the complete verification of fund data. Furthermore, the details that such audits may reveal are often untimely, since investors may not have a chance to see the details for up to a year or more after the information is generated. Additionally, audits opine on financial statements as a whole rather than individual components.

"Managed account" solutions may offer the investor full transparency into the account, but they may be problematic from the hedge fund manager's point of view because such transparency exposes the manager's investment strategy. Moreover, implementing managed account platforms can be costly and difficult to maintain.

"Agreed upon Procedures" are certain reporting procedures performed under professional accounting attestation standards, and are typically conducted by an external certified public accountant. However, Agreed upon Procedures can be costly and difficult to execute, and can be disruptive to the back office of the hedge fund.

A "SAS 70" is an examination conducted by a Certified Public Accountant firm. SAS 70s are often untimely because the reports may not be available until months after the initial testing.

Thus, there is a need to provide reliable information to investors and prospective investors from hedge funds via engagement of a third-party, which assumes responsibility for confirmation and reporting of hedge fund information.

BRIEF SUMMARY

In one aspect of this disclosure, a system and computer-implemented method are disclosed for confirmation of hedge fund information. The system and method comprise storing in memory a list of assets/liabilities of a hedge fund and a fund-provided value of each asset/liability. Corroborating data received from a third party independent of the hedge fund is stored in memory, the corroborating data confirming the existence of at least one asset/liability of the hedge fund. An asset/liability confirmation is performed, using a processor, by comparing the corroborating data to the list of assets/liabilities to identify third party confirmed assets/liabilities of the hedge fund that correspond to the corroborating data. A total value of third party confirmed assets/liabilities is calculated, using a processor, based upon the fund-provided value of each third party confirmed asset/liability.

In another aspect of this disclosure, the system and computer-implemented method comprise storing in memory third party values for assets/liabilities of the hedge fund, wherein the third party values are provided by a third party independent of the hedge fund. A price input confirmation is performed, using a processor, by comparing the stored fund-provided value of each asset/liability to the stored third party value of the asset/liability, wherein the fund-provided value of each asset/liability is identified as a confirmed value when the fund-provided value substantially corresponds with the stored third party value of the asset/liability. A total confirmed value of assets/liabilities is calculated, using a processor, based upon the identified confirmed values.

In another aspect of this disclosure, a unique identifier is generated, using a processor, and assigned to a confirmation instance, wherein the confirmation instance is the performed asset/liability confirmation and the price input confirmation. A report is generated, using a processor, that identifies (A) a proportion of a net asset value of the hedge fund attributable to the total value of third party confirmed assets/liabilities that is based on confirmed assets/liabilities, and (B) a proportion of the net asset value attributable to the total confirmed value of assets/liabilities. The unique identifier is associated, using a processor, to the generated report. Risk and/or performance data associated with the hedge fund's positions is generated based at least on an analysis of the hedge fund's books and records data. A second report is generated, using a processor, that identifies the generated risk and/or performance data, and associates, using a processor, the unique identifier to the second report, wherein the second report includes the unique identifier to link the generated reports and certify that the asset/liability confirmation and the price input confirmation have been performed.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a computer-implemented method and specialized system for confirmation of hedge fund assets/liabilities for use in reporting to investors. In accordance with this disclosure, an independent party is interposed between the hedge fund and the investor, who is responsible for attempting to confirm the accuracy of the information provided in hedge fund reporting by use of external inputs obtained from third parties independent of the hedge fund. This preferably provides investors with greater certainty and understanding of hedge fund performance. Additionally, the disclosed system and method may prevent fraud and misrepresentations in hedge fund reporting. Overall, this may improve the efficiency of the allocation of capital to hedge funds. Moreover, the system and method includes analytic and reporting capabilities that make it a valuable planning tool for fund managers.

The method and specialized system for confirmation of hedge fund assets/liabilities is preferably implemented as a hedge fund confirmation agent system 100. The hedge fund confirmation agent system 100 may include multiple computing systems, databases, data inputs, software processes, etc. The confirmation agent system 100 preferably performs a confirmation of hedge fund assets/liabilities and generates reports regarding hedge fund asset/liability information, and risk and performance, with a certification that the confirmation process has been performed. Confirmation of hedge fund assets/liabilities may involve utilizing hedge fund provided information (e.g., the books and records of the hedge fund) in concert with external information to determine a maximum extent to which the hedge fund provided information might be corroborated as "confirmed," expressed as a percentage of the fund's NAV. Certification of hedge fund asset/liability information may leverage the confirmation process by tying subsequent hedge fund risk and performance analytic reporting back to the confirmation process.

Figure 1:
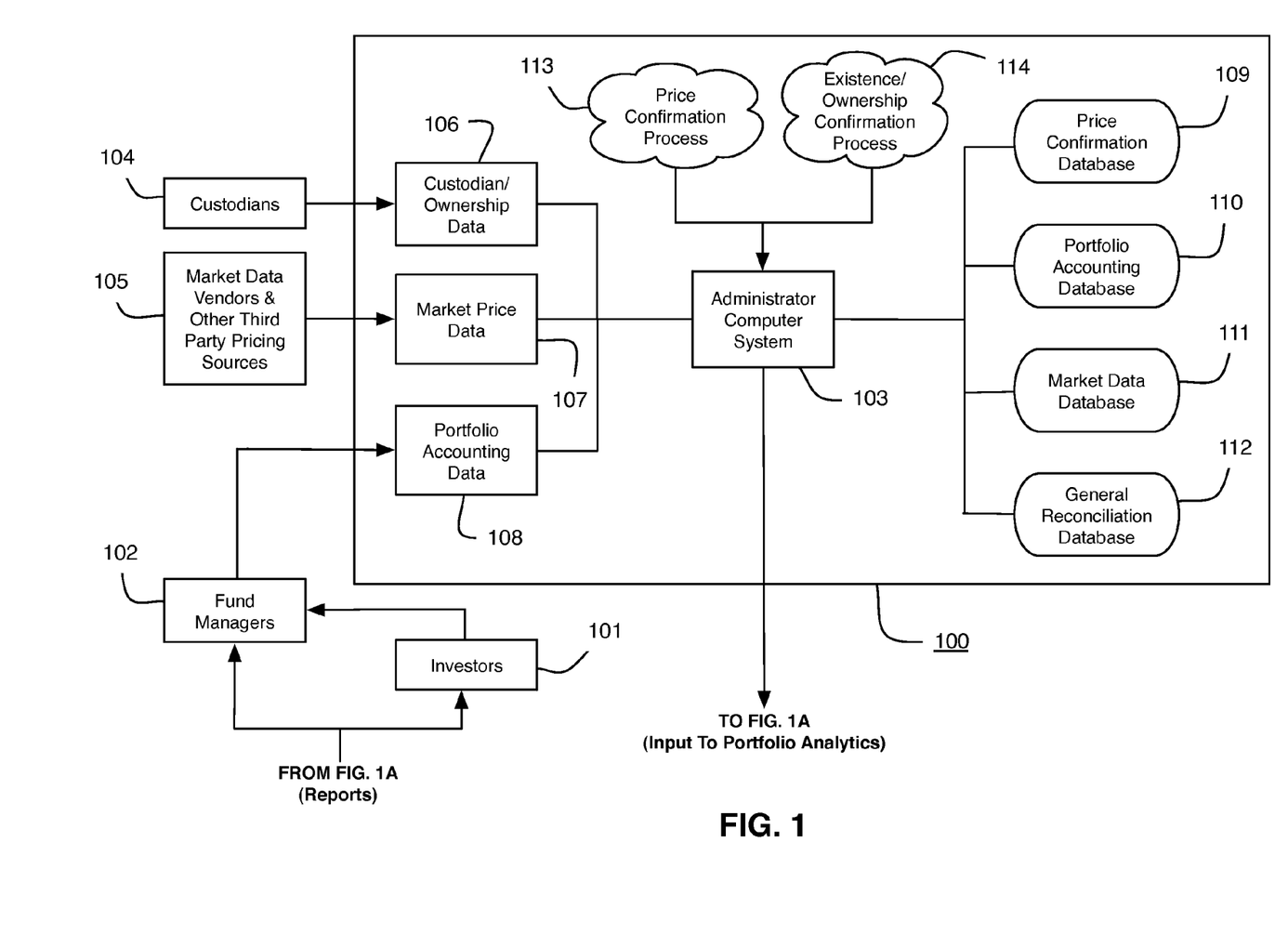
FIG. 1 is a high level representation of the parties involved with and components included in an illustrative hedge fund confirmation agent system.
Figure 1A:
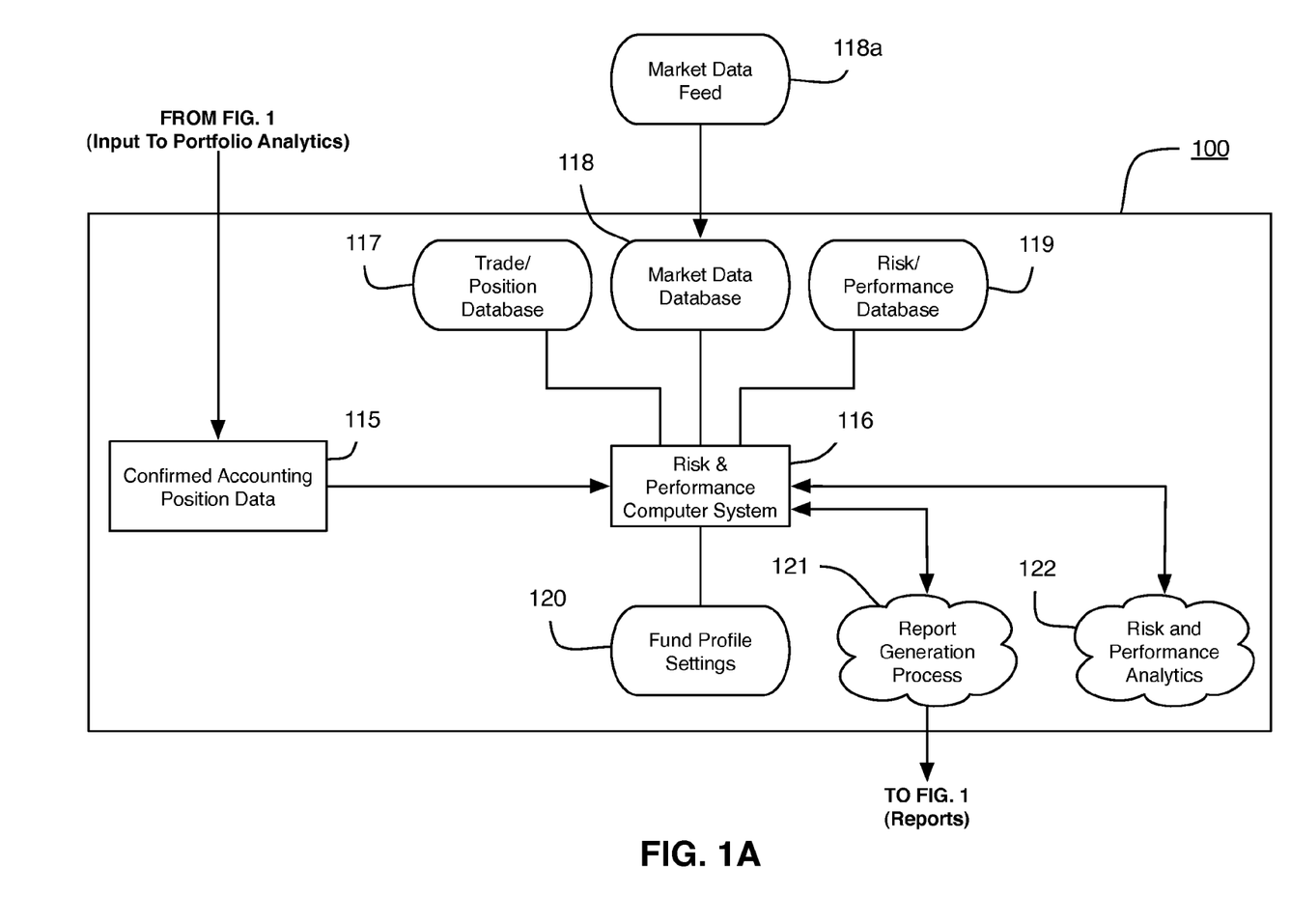
FIG. 1A is a continuation of the high level representation of the illustrative hedge fund confirmation agent system of FIG. 1.

FIGS. 1 and 1A are a high level representation of the parties involved with and preferred components included in an illustrative hedge fund confirmation agent system 100. The portion of the confirmation agent system 100 illustrated in FIG. 1 is preferably responsible for confirmation. The portion of the confirmation agent system 100 illustrated in FIG. 1A is preferably responsible for reporting, risk and performance analytics, using information certified as having completed the asset/liability and price input confirmation process.

Investors 101 may represent hedge fund clientele who have capital invested with the hedge fund. Fund managers 102 may represent parties who oversee the operation of a hedge fund, and may be responsible for overseeing the fund portfolio, making trading decisions, hiring staff and other general management duties. Administrator computer system 103 may be a centralized computer system or computer system process, tasked with executing the confirmation process, which may include receiving data, sorting it to the appropriate data storage location and initiating processes necessary to complete confirmation.

Hedge fund confirmation agent system 100 may receive data inputs from a variety of sources. As depicted in FIG. 1, investors 101 provide data to fund managers 102. This data may represent investor demands/instructions with respect to their investment in the hedge fund. This, in turn, may drive actions/decisions undertaken by fund managers 102 with respect to the capital owned by the investor 101, including the investment of such investments alongside other investors in the Fund's portfolio. Fund managers 102 may provide Portfolio Accounting Data 108 to hedge fund confirmation agent system 100. Portfolio Accounting Data 108 preferably represents a complete accounting of the hedge fund's assets and liabilities (e.g., the hedge fund's books and records), as well as information on pricing, positions, and other related information. Portfolio Accounting Data 108 may include (but is not limited to) a listing of assets/liabilities of the hedge fund and fund-provided values for the assets/liabilities.

Portfolio Accounting Data 108 is preferably supplemented by data inputs from one or more third parties independent of the hedge fund, such as, for example, Custodians 104 and Market Data Vendors and Other Third Party Pricing Sources 105. Custodians 104 may represent parties responsible for holding (whether physically or logically) instruments owned by the hedge fund. Custodians provide Custodian/Ownership Data 106 to hedge fund confirmation agent system 100. Custodian/Ownership Data 106 may include evidence corroborating the existence, ownership and custody of financial instruments purportedly owned by the hedge fund.

Market Data Vendors and Other Third Party Pricing Sources 105 may represent third parties independent from the hedge fund responsible for supplying pricing information to hedge fund confirmation agent system 100. Market Data Vendors are preferably independent entities that capture and compile market data and provide the information to receiving clientele or subscribers. Other Third Party Pricing Sources are preferably independent entities that provide estimated prices for financial instruments. These entities are useful when prices cannot be ascertained directly from market data, and a judgment-based evaluation is necessary to determine a price. Market Data Vendors and Other Third Party Pricing Sources 105 preferably provide Market Price Data 107 to hedge fund confirmation agent system 100. Market Price Data 107 may, therefore, represent third party values (e.g., a set of exit prices, closing prices, price estimates, and other related pricing data) of assets/liabilities owned by the hedge fund.

Once the data inputs 106-108 are received, they may be indexed with a unique identifier, which will be described further below. The unique identifier preferably serves as an identifying index for the data set, and will eventually serve as a certification that the confirmation process was performed. The data inputs may then be stored in databases 109-112. Portfolio Accounting Database 110 is preferably a computer database responsible for storing the Portfolio Accounting Data 108. Market Data Database 111 is preferably a computer database responsible for storing Market Price Data 107 (which may include third party values and quoting prices). Price Confirmation Database 109 is preferably a computer database responsible for storing the results of Price Confirmation Process 113. General Reconciliation Database 112 is preferably responsible for storing the results of the Existence/Ownership Confirmation Process 114. Databases 109-112 may be implemented as a single storage device or a configuration of multiple storage devices, depending on the ultimate requirements of the system. Databases 109-112 are represented here as multiple storage devices for illustrative purposes.

Price Confirmation Process 113 is preferably an executable software process running on a computer system, such as, for example, administrator computer system 103. Price Confirmation Process 113 may be tasked with determining the extent to which the fund-provided values of assets and liabilities are considered confirmed for the fund.

Existence/Ownership Confirmation Process 114 is preferably an executable software process running on a computer system, such as, for example, administrator computer system 103. Existence/Ownership Confirmation Process 114 may be tasked with determining the extent to which the existence and/or ownership of assets and liabilities are considered confirmed for the fund.

Alternatively, the Price Confirmation Process 113 and the Existence/Ownership Confirmation Process 114 may be executed on the database on which the results of the process will be stored (e.g., Price Confirmation Database 109 and General Reconciliation Database 112, respectively). The processes may also be run on other computer(s), or on any suitable combination of computing devices, and sent to their storage destinations via network, disk, etc. The methodology of the processes will be further described below. Once the confirmation processing is complete, administrator computer system 103 preferably sends the confirmation data and the original data inputs all tagged or assigned with a unique identifier (discussed further below with respect to step 307 in FIG. 3) to the certification portion of hedge fund confirmation agent system 100 (FIG. 1A).

FIG. 1A preferably represents the aspect of hedge fund confirmation agent system 100 responsible for certification, risk and performance analytics, and reporting. Confirmed Accounting Position Data 115 is received from administrator computer system 103 after the confirmation process is complete. This information may include (but is not limited to) the original data inputs and the results from the confirmation process, all tagged or assigned with the unique identifier. Confirmed Accounting Position Data 115 may be passed through a Risk & Performance Calculation computer system 116 and stored in respective database stores 117-120.

Trade/Position Database 117 is preferably responsible for storing much of the original data inputs received in FIG. 1 and the results of the confirmation process, including data from the General Reconciliation Database 112, Portfolio Accounting Database 110 and Price Confirmation Database 109.

Market Data Database 118 is preferably responsible for storing additional market data necessary to perform risk and performance analytic processing. The additional market data may include (but is not limited to) historical market data, modeling information and other similar indices. If this information was not received with the original Market Price Data 107, it may now be received from an optional external Market Data Feed 118a.

Risk/Performance Database 119 is preferably responsible for storing the results of the Risk and Performance Analytics process 122. Fund Profile Settings 120 may represent specific settings tailored to suit the needs of particular clients (e.g., fund managers) with regard to reporting, risk and performance analytics, or both. These customizable settings may be simplistic (e.g., affecting report format) or substantive (e.g., altering the way analytics are calculated for a particular fund).

Report Generation Process 121 is preferably a software process executing on Risk & Performance Calculation computer system 116 that receives raw and/or processed data from databases 117-120 and produces formatted reports (described further below) for presentation to fund managers and investors. The Report Generation Process 121 preferably includes the desired configuration of the reports. Risk and Performance Analytics 122 represents software processes preferably executing on Risk & Performance Calculation computer system 116 that receive data from databases 117-120 and perform further analysis of the hedge fund assets and liabilities based upon the books and records of the hedge fund (described further below). A risk and performance model configuration is preferably included in the Risk and Performance Analytics 122. After the Risk and Performance Analytics 122 are completed, the results may be stored in Risk/Performance Database 119, and the hedge fund confirmation agent system 100 may subsequently execute the Report Generation Process 121 to generate the reports (also described further below). The reports generated by the hedge fund confirmation agent system 100 preferably include and/or are otherwise assigned a reference to the unique identifier, which may be used to index the data sets from which the reports were generated, identify the current reporting period, and, most importantly, certify that the confirmation process was performed. These generated reports are then preferably sent by the hedge fund confirmation agent system 100 to the Fund Manager 102 and/or Investors 101 as illustrated in FIGS. 1 and 1A.

Figure 2:
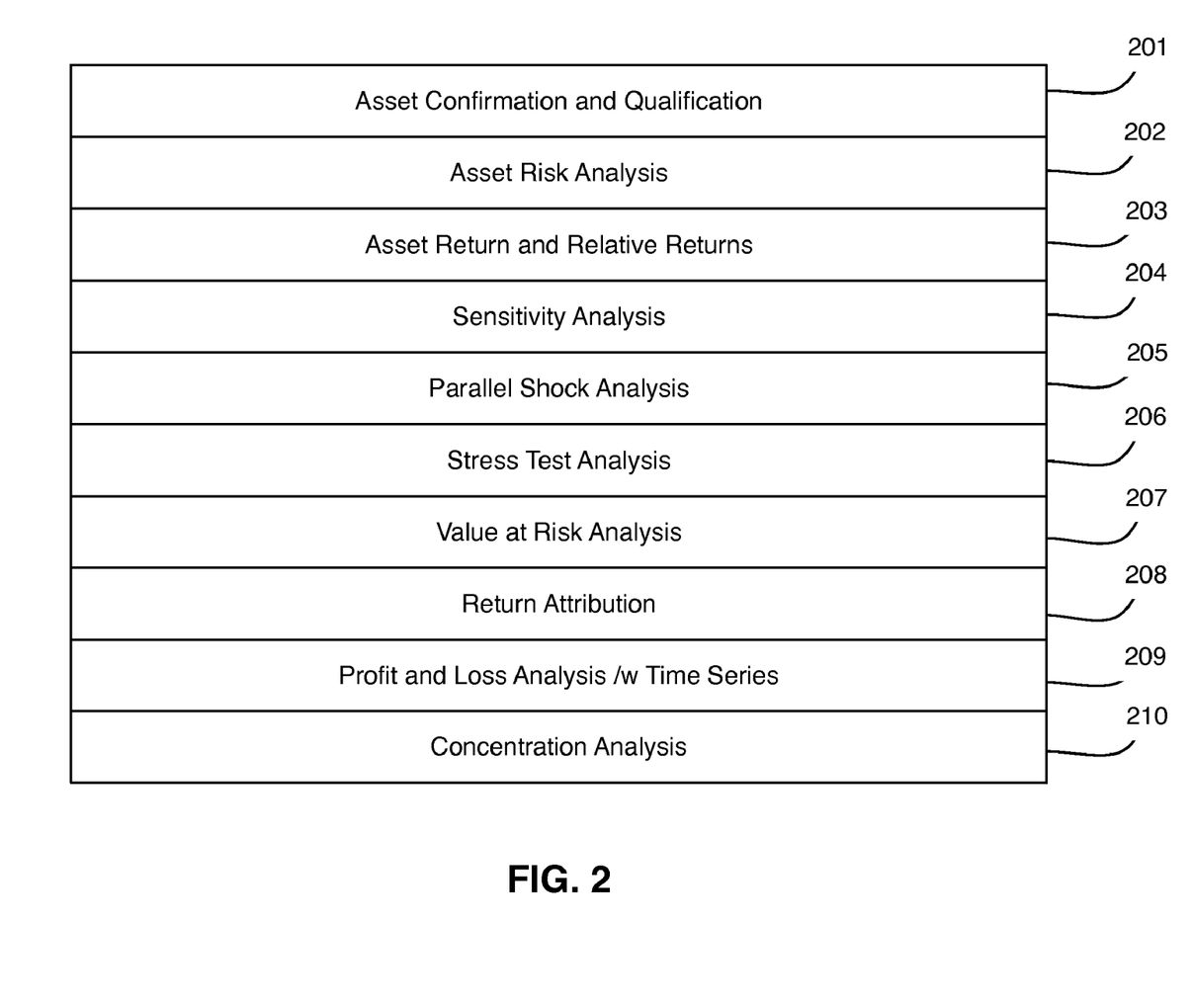
FIG. 2 is a high level representation of the analytical capability of the illustrative hedge fund confirmation agent system of FIGS. 1 and 1A, described as a series of layers.

FIG. 2 is representative of the analytical capability of an illustrative hedge fund confirmation agent system 100, described as a series of layers 201-210. Layer 201 preferably represents the Asset Confirmation and Qualifications layer, which preferably represents the initial confirmation performed by the hedge fund confirmation agent system 100. This layer may represent the initial confirmation performed after the hedge fund provided Portfolio Accounting Data 108 and third party information are received. The third party information preferably includes (but is not necessarily limited to) the Custodian/Ownership Data 106 and Market Price Data 107 (as described above) provided by one or more third parties independent from the hedge fund. The information is processed by the confirmation agent system 100 to calculate at least a NAV of the fund and a percentage of assets/liabilities independently confirmed by the hedge fund confirmation agent system 100, and to illustrate other attributes revealed from the data collected. The remaining layers illustrated in FIG. 2 will be described further below.

Figure 3:
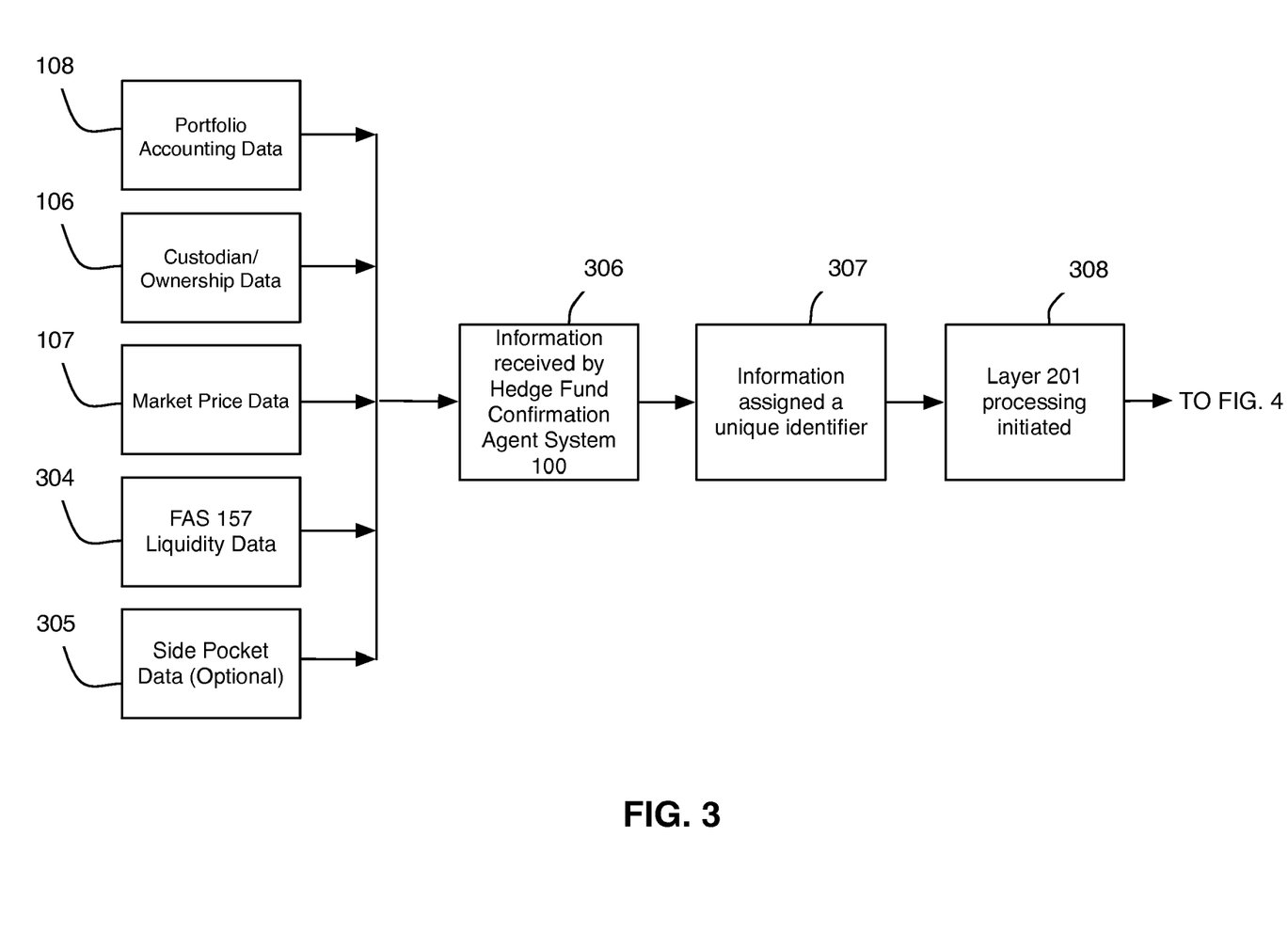
FIG. 3 is a flow chart representing a preferred sequence of steps for performing a confirmation analysis by the hedge fund confirmation agent system.
Figure 4:
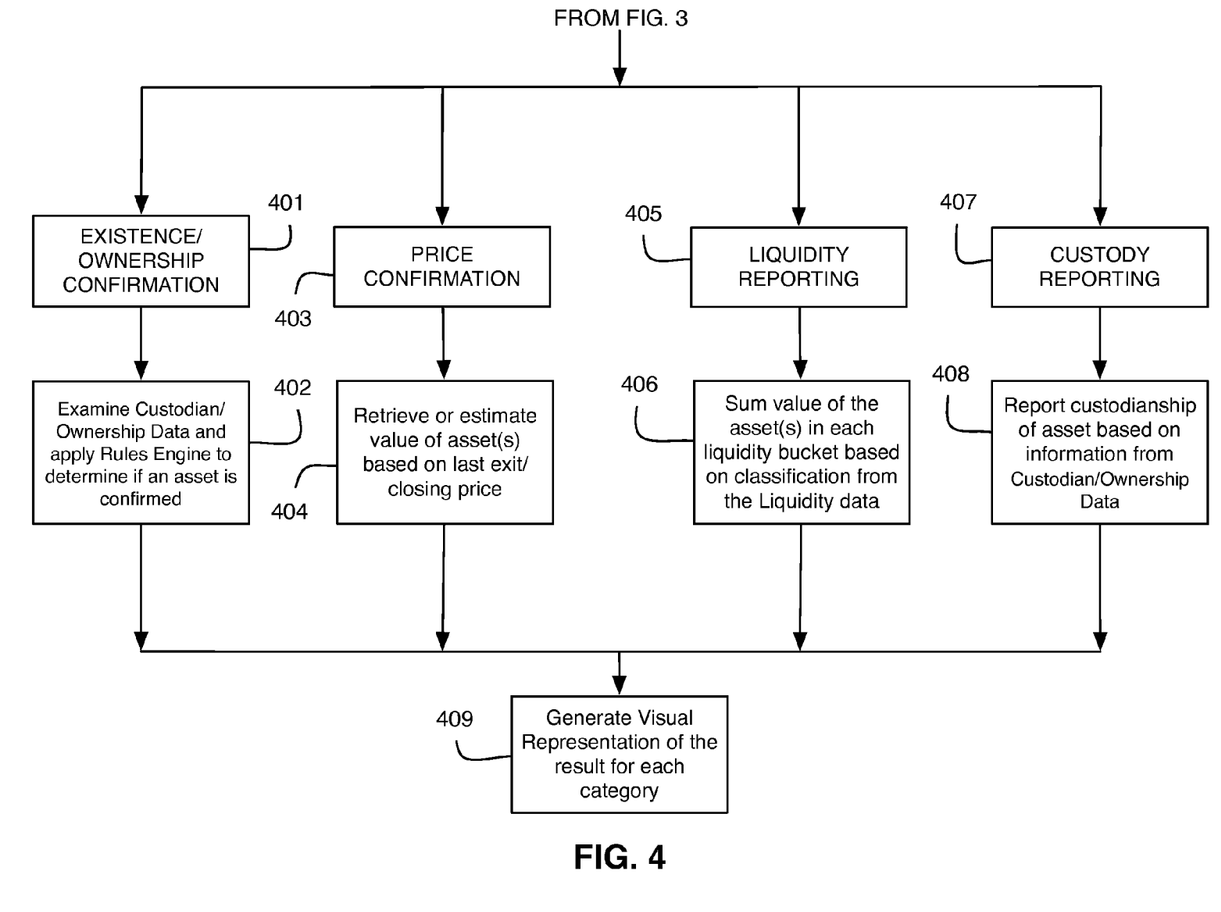
FIG. 4 is a flow chart continuing to represent the preferred sequence of steps of FIG. 3.

FIGS. 3-4 are flow charts representing a preferred sequence of steps performed by the hedge fund confirmation agent system 100 in conducting the layer 201 (FIG. 2) confirmation analysis. As discussed above with respect to FIG. 1, Portfolio Accounting Data 108 is preferably a thorough accounting of the assets, liabilities, positions, trades and other financial information related to the fund to be confirmed, as provided by the Fund Manager 102. Portfolio Accounting Data 108 is preferably used in conjunction with corroborating data obtained from one or more third parties independent from the hedge fund, which may include Custodian/Ownership Data 106, Market Price Data 107, FAS 157 Liquidity Data 304 and/or Side Pocket Data 305, during the confirmation process. The creation of data inputs 106-108, 304, 305 are preferably performed by external systems, parties or processing groups and stored on internal databases (as described above). For example, some or all of the information may be received by the confirmation agent system 100 via automated feeds.

The Portfolio Accounting Data 108 is used by the hedge fund confirmation agent system 100 to perform the subsequent analyses described below. Additionally, the confirmation agent system 100 may calculate a NAV using data from Portfolio Accounting Data 108. The NAV may represent a reported, fund-provided total value of all assets and liabilities in the portfolio. As will be discussed further below, the result of the subsequent analyses will preferably be expressed as a total confirmed percent of the NAV. Portfolio Accounting Data 108 may, in some cases, be incomplete, in which case confirmation preferably proceeds with incomplete data, and may be revised as more data becomes available.

As discussed above with respect to FIG. 1, Custodian/Ownership Data 106 preferably pertains to the existence, ownership and custody of fund assets and liabilities, as documented by information obtained from one or more third parties independent of the hedge fund. The purpose of this data 106 is twofold. First, the data 106 is used to confirm that the asset/liability in question actually exists and is held on behalf of the hedge fund claiming ownership. Second, the data 106 may be utilized to confirm the actual custody of assets and liabilities related to the hedge fund, as corroborated by the custodian/counterparty itself. Custodians may include entities such as prime brokers, banks, transfer agents, etc. The actual evidential data provided to the hedge fund confirmation agent system 100 is preferably based on documentary evidence (in hard copy or electronic form), received directly from an independent source. Once the evidence has been received, the information is compiled for processing and stored on a database associated with the hedge fund confirmation agent system 100. The information may be received via an electronic feed from the confirming party documenting the asset/liability or via direct communication with the confirming party.

As discussed above with respect to FIG. 1, Market Price Data 107 preferably pertains to the confirmation of the value of assets/liabilities of the fund, as determined by reference to information provided by an independent third party. Price confirmation of fund assets and liabilities may be determined, for example, by analyzing the exit price for an asset held using independent Market Price Data 107, or by the amount required to be paid for a liability to be extinguished. For most illiquid assets, price confirmation becomes extremely challenging, as the availability of externally obtained pricing information in these circumstances is uncommon. Market Price Data 107 may, therefore, include independently obtained estimated prices for illiquid assets potentially obtained from, for example, one or more other third party pricing sources 105 (described above). In such cases, the fund-provided value of the asset/liability in the Portfolio Accounting Data 108 may be compared to the third party value for that asset/liability obtained from other third party pricing sources 105.

Referring to FIG. 3, FAS 157 Liquidity Data 304 preferably pertains to the liquidity of the assets/liabilities of the hedge fund, based upon classification of assets/liabilities by the Fund Manager 102 in accordance with Financial Accounting Standards Board Number 157 ("FAS 157") categorizations. Hedge fund confirmation agent system 100 preferably does not perform any type of confirmation or sorting process on the FAS 157 Data 304, and instead utilizes the data as provided by the Fund Managers 102. More information on FAS 157 may be obtained at the Financial Accounting Standards Board's summary of FAS 157, located at http://www-.fasb.org/summary/stsum157.shtml, which states that FAS 157 "establishes a fair value hierarchy that distinguishes between (1) market participant assumptions developed based on market data obtained from sources independent of the reporting entity (observable inputs) and (2) the reporting entity's own assumptions about market participant assumptions developed based on the best information available in the circumstances (unobservable inputs)."

The FAS 157 standard may be useful in reporting liquidity, as it requires an entity to segregate its portfolio into three valuation "buckets" in accordance with the FAS 157 standard. Fund Managers 102, subject to review by auditors, typically sort fund assets, liabilities and other instruments into one of three buckets. The first FAS 157 bucket represents the most liquid assets that trade on an organized exchange. The second FAS 157 bucket represents assets that may be valued utilizing observable and verifiable inputs. The third FAS 157 bucket represents the most illiquid securities that are valued utilizing internal processes, making confirmation by reference to sources independent of the manager extremely difficult.

Side Pocket Data 305 preferably pertains to special "side pocket" accounts, which are typically used to separate illiquid assets from more liquid assets. Although the value of assets placed in side pocket accounts is traditionally difficult to determine, the existence of such assets and their ownership by the fund may often be readily ascertained. For this reason, side pocket information 305 may be provided to the hedge fund confirmation agent system 100 by the Fund Manager 102.

In step 306 of FIG. 3, data inputs 106-108, 304, 305 may be received and stored in databases 109-112, as described above with respect to FIG. 1. The data inputs are preferably reviewed by administrator computer system 103, which is preferably responsible for ensuring the accuracy, integrity and consistency of the information. The administrator computer system 103 preferably includes a software process responsible for checking over the technical integrity of the data inputs 106-108, 304, 305. Reviewing the data inputs 106-108, 304, 305 preferably minimizes the number of times hedge fund confirmation agent system 100 would have to be re-run due to mistakes or errors in the initial data inputs.

In step 307 of FIG. 3, after the data inputs 106-108, 304, 305 are received, the hedge fund confirmation agent system 100 preferably assigns a unique identifier to the data inputs. The unique identifier preferably includes a hedge fund identifier number, a reporting date and a version number, thereby linking each data input 106-108, 304, 305 to a specific hedge fund, a reporting date and a version (or executed iteration of the hedge fund confirmation agent system 100). The unique identifier enables quick and easy access to the information contained in the data inputs 106-108, 304, 305 using any single lookup based on any combination of the hedge fund identifier number, reporting date and/or version number. After assignment of the unique identifier, the confirmed data may be considered "locked," blocking any parties from thereafter altering the data. Finally, as will be discussed further below, the unique identifier may serve as a critical certification that the layer 201 Asset Confirmation and Qualification procedure was performed.

Processing of data inputs 106-108, 304, 305 by the hedge fund confirmation agent system 100 is preferably initiated in step 308 of FIG. 3.

FIG. 4 is a flowchart showing the preferred sequence of steps executed by hedge fund confirmation agent system 100 after processing is initiated in step 308. In step 401, the confirmation agent system 100 preferably initiates the Existence/Ownership Confirmation (asset/liability confirmation) processing track, which is preferably tasked with determining whether each asset/liability in the hedge fund actually exists and/or whether it is owned by the hedge fund based on the relevant data input. Administrator computer system 103 preferably initiates the Existence/Ownership Confirmation Process 114, which may execute as a software process on the administrator computer system 103 or the General Reconciliation Database 112. Existence/Ownership Confirmation Process 114 may instruct a central processing unit (CPU) of the administrator computer system 103 and/or the General Reconciliation Database 112 to retrieve the Portfolio Accounting Data 108 from the Portfolio Accounting Database 110, and Custodian/Ownership data 106 from storage located on General Reconciliation Database 112. The aggregate data may then be placed in fast random access memory (RAM) for processing. Existence/Ownership Confirmation Process 114 may then instruct the CPU to extract a full list of hedge fund provided assets, liabilities, instruments, etc. from Portfolio Accounting Data 108.

In step 402, Existence/Ownership Confirmation Process 114 preferably instructs the CPU of the administrator computer system 103 to perform an asset/liability confirmation by comparing the generated list of hedge fund provided assets/liabilities to the asset/liability corroborating data received from third party(s) independent from the fund contained in Custodian/Ownership Data 106. A rules engine may be used to determine whether fund-provided assets/liabilities are considered third party confirmed assets/liabilities. The rules engine preferably includes a plurality of rules to determine whether the existence and/or ownership of an asset/liability has been third party confirmed, depending on the type of asset/liability being examined. The rule set is preferably customizable as necessary to identify and address a wide variety of asset, liability and instrument types and situations.

For example, assets and liabilities may be grouped into different categories based on their class. These classes may include publicly traded equities, derivatives such as "over-the-counter" (OTC) options or interest rate swaps, or investments in other hedge funds/private equity funds, bonds, money market funds, exchange-traded funds, mutual funds, etc. The rules engine may designate that for a certain class (e.g., publicly traded equities and OTCs), only a direct custodian feed or broker statement will confirm the existence/ownership of a particular asset/liability. Other rules may be applied to other categories of asset type. For instance, the rules engine may designate that for derivatives such as interest rate swaps, only a counterparty statement received directly from the counterparty will confirm the existence/ownership of a particular asset. As another example, for investments in other hedge funds/private equity funds, only an investor statement received directly from an external party will be adequate as confirmation.

Existence/Ownership Confirmation Process 114 preferably utilizes this rule set in conjunction with the corroborating data in Custodian/Ownership Data 106 to perform the asset/liability confirmation to determine to what extent the assets/liabilities in the fund are third party confirmed with respect to existence/ownership. This information may then be stored in long-term storage on the General Reconciliation Database 112 for further processing by hedge fund confirmation agent system 100.

In step 403, administrator computer system 103 may initiate the Price Confirmation (price input confirmation) processing track, which may be tasked with confirming the prices of assets, liabilities, and other financial instruments in the hedge fund under consideration. The Price Confirmation Process 113 may perform this processing track. Price Confirmation Process 113 may be software code executing on a CPU of administrator computer system 103 or Price Confirmation Database 109. Price Confirmation Process 113 preferably instructs the CPU to retrieve fund-provided Portfolio Accounting Data 108 from the Portfolio Accounting Database 110 and Market Price Data 107 from the Market Data Database 111, and store the aggregate data in local RAM for computation. As discussed above, the fund-provided Portfolio Accounting Data 108 preferably includes a full list of hedge fund assets/liabilities, the class to which each individual asset/liability belongs, and their reported, fund-provided value, as provided by the Fund Manager 102. The Market Price Data 107 preferably includes third party values (e.g., market prices and/or estimated prices provided by one or more third parties independent from the hedge fund) for assets/liabilities in the hedge fund received by the hedge fund confirmation agent system 100 from market data vendors and/or other third party pricing sources 105.

In step 404, Price Confirmation Process 113 may instruct the CPU to perform a price input confirmation by comparing the fund-provided value for each asset/liability from the Portfolio Accounting Data 108 to the third party value for the asset/liability in the Market Price Data 107, and then apply a rules engine to each comparison to determine whether the asset/liability value may be considered confirmed. The rules engine preferably includes a plurality of rules to determine whether an asset/liability value has been confirmed, defined by the type of asset/liability being examined. For example, the rules engine may state that for a publicly traded equity asset, the fund-provided value 108 reported by the Fund Manager 102 must fall within a certain percentage of the corroborated third party value 107 to be considered a confirmed value.

Other types of assets/liabilities may have more complex rule sets applied to them. For example, confirmation of derivatives, such as OTC options, may include multiple methods of price confirmation. The Price Confirmation Process 113 may, for example, consider an OTC option confirmed if the Market Price Data 107 includes information indicating that a counterparty statement reflecting the reported market value of the derivative has been received directly from the counterparty. Alternatively, the OTC option may be considered confirmed if a broker quote reflecting the reported market value of the derivative has been received directly from a broker. The OTC option may also be considered confirmed if a broker quote is received from a Fund Manager 102 and the quote value is within an agreed percentage tolerance of a value indicated on an independently sourced counterparty statement.

In other cases, additional intervention may be required to determine whether a fund-provided asset value may be deemed confirmed by the hedge fund confirmation agent system 100. For instance, if the broker quote received from a Fund Manager 102 is greater than the agreed percentage tolerance of a value indicated on an independently sourced counterparty statement, the matter may be escalated to an external process for additional consideration. Alternatively, an external processing group or team of people may be utilized to aid in valuation for difficult situations. After application of the rules engine, Price Confirmation Process 113 preferably instructs the CPU to store the results of the process in long-term storage on Price Confirmation Database 109.

Once the asset/liability confirmation and the price input confirmation have been performed (collectively referred to as a "confirmation instance"), a CPU within the hedge fund confirmation agent system 100 preferably assigns the generated unique identifier to the confirmation instance.

Once the Price Confirmation Process 113 and the Existence/Ownership Confirmation Process 114 have been completed, all relevant data sets associated with that confirmation instance are provided to the Risk & Performance Calculation computer system 116, which is responsible for certification, risk and performance analytics and reporting, as illustrated in FIG. 1A (described above). The Risk & Performance Calculation computer system 116 preferably stores the relevant data sets in Trade/Position Database 117. Report Generation Process 121 may thereafter be invoked to cause the hedge fund confirmation agent system 100 to generate reports based on the results of the Price Confirmation Process 113 and the Existence/Ownership Confirmation Process 114, and to provide FAS 157 Liquidity and Custody Reporting.

To ensure that all relevant data inputs 106-108, 304, 305 have been provided to the Risk & Performance Calculation computer system 116 several risk/performance checks are preferably performed. A Raw Data Check, such as, for example, a position count, may be performed by computer system 116 (or another computer system) to ensure that all relevant data inputs have been received. Computer system 116 (or another computer system) may also perform a Consistency Check to ensure that common data between layers 201-210 are in sync. A Reasonability Check may also be conducted to ensure that data in each layer 201-210 is accurate or otherwise makes sense.

In step 405, the Report Generation Process 121 initiates the Liquidity Reporting track by retrieving the Portfolio Accounting Data 108 and storing it in RAM for computation. Portfolio Accounting Data 108 preferably includes FAS 157 Liquidity Data 304 and/or Side Pocket Data 305, both provided by the Fund Manager 102. Alternatively, FAS 157 Liquidity Data 304 and/or Side Pocket Data 305 may be encapsulated in independent data sets. FAS 157 Liquidity Data 304 preferably includes information necessary to calculate the percentage of fund assets/liabilities extant in each FAS 157 level listed in the Portfolio Accounting Data 108 based on the FAS 157 standard, as determined and provided by the Fund Manager 102.

In step 406, Report Generation Process 121 preferably instructs the CPU to sum the fund-provided values of assets/liabilities, as listed in Portfolio Accounting data 108, in each FAS 157 bucket (as sorted by the Fund Manager 201 and provided in FAS 157 Liquidity Data 304). The result may constitute a total of assets and liabilities for each FAS 157 level. Report Generation Process 121 may then store the information in local long-term or short-term memory for further processing by the hedge fund confirmation agent system 100.

Report Generation Process 121 may also perform a side pocket analysis within the FAS 157 Liquidity Reporting processing track 405. Report Generation Process 121 may instruct the CPU to retrieve the Side Pocket Data 305 (if it exists) from long-term storage and store it in a fast access memory device for computation. Side Pocket Data 305 preferably includes information regarding heavily illiquid assets that are segregated from the other assets in the hedge fund under consideration. These assets may typically fall under the third liquidity level in the FAS 157 specification. Report Generation Process 121 may instruct the CPU to extract the asset information from the Side Pocket Data 305, and then sum the value of the side pocket assets to produce a total dollar value for assets/liabilities in the side pocket. This information may then be stored in long-term storage or short-term memory for further processing.

In step 407, Report Generation Process 121 preferably initiates the Custody Reporting processing track, which is tasked with performing a custodial analysis of the assets in the hedge fund under consideration. Report Generation Process 121 preferably instructs the central processing unit to retrieve Portfolio Accounting Data 301 and Custodian/Ownership Data 302 from Trade/Position Database 117 and store it in fast access memory for processing. In step 408, Report Generation Process 121 preferably instructs the CPU to generate a list of custodians from Custodian/Ownership Data 302 and assign each asset from Portfolio Accounting Data 301 to a custodian by extracting the identifying information from the Custodian/Ownership Data 302. Report Generation Process 121 may then instruct the CPU to sum prices of the assets held by each custodian, and store that information in long-term or short-term storage for further processing by the hedge fund confirmation agent system 100.

Figure 5:
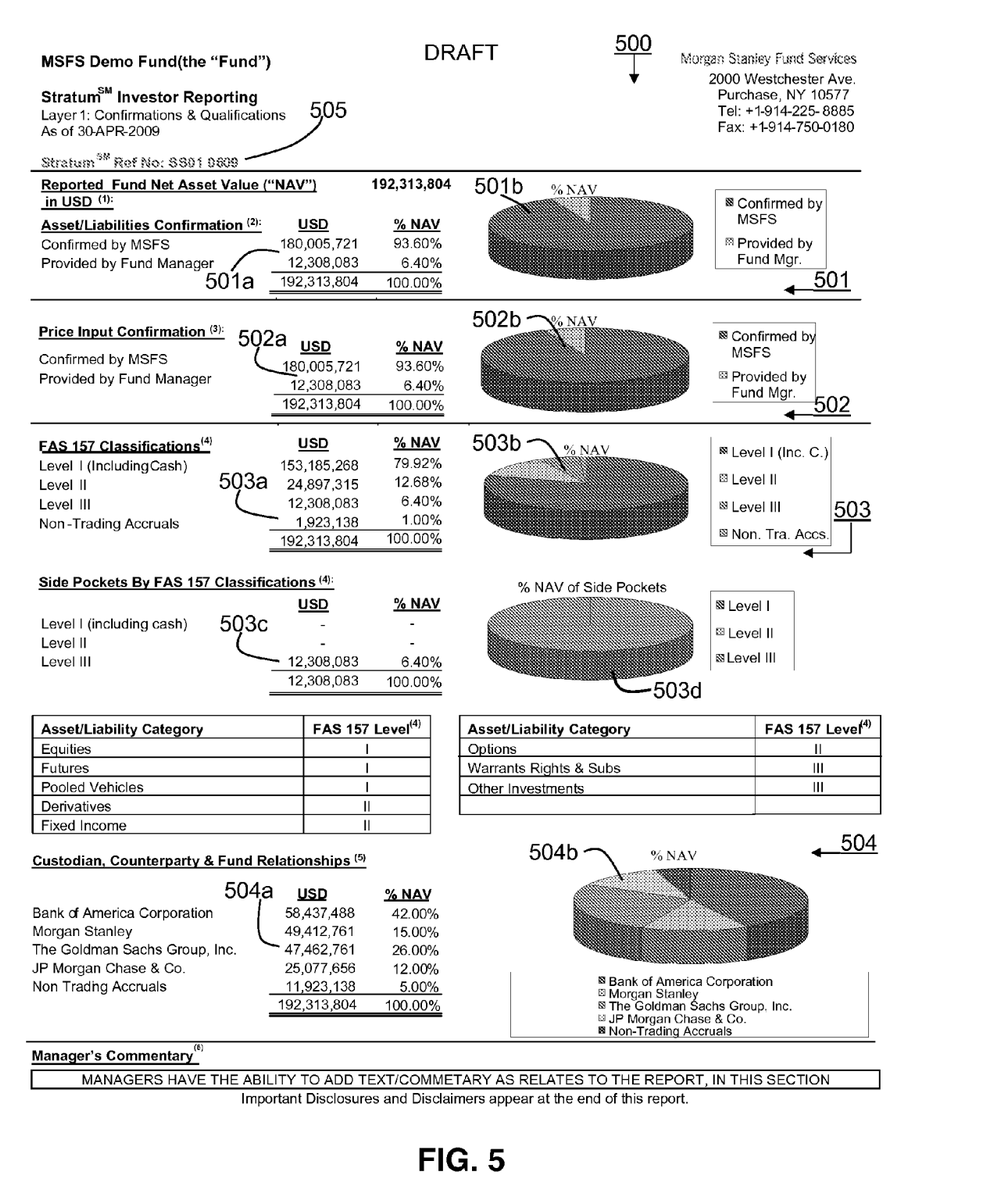
FIG. 5 is an illustrative report generated by the hedge fund confirmation agent system that summarizes the results of the confirmation analysis.

In step 409, Report Generation Process 121 may instruct the hedge fund confirmation agent system 100 to generate a report 500 for the layer 201 Asset Confirmation and Qualification analysis. Report Generation Process 121 preferably instructs the CPU to retrieve the previously stored results of Price Confirmation Process 113 and Existence/Ownership Confirmation Process 114. Report Generation Process 121 may instruct the CPU to separately sum the fund-provided values (as reported in the Portfolio Accounting Data 108) of third party confirmed assets/liabilities and third party confirmed values, and compare those sums to the total sum of fund-provided asset/liability values in Portfolio Accounting Data 108 to generate a visual report of confirmed assets/liabilities expressed as total percentage of NAV. A visual report may be generated for the Price Confirmation Process 113, and another visual report may be generated for Existence/Ownership Confirmation Process 114. Report Generation Process 121 may instruct the CPU to retrieve the results of the Liquidity Reporting processing track 405 and Custody Reporting processing track 407. As above, the results of both tracks are formatted or otherwise converted into a visual representation expressed as a percentage of NAV.

FIG. 5 is an illustrative report 500 generated by Report Generation Process 121 of the hedge fund confirmation agent system 100, which summarizes the results of the layer 201 Asset Confirmation and Qualification analysis. It is understood that the report 500 shown in FIG. 1 is illustrative and that the report may be altered to present some or all of the information in a variety of customizable formats.

The report 500 preferably includes or is otherwise associated with the unique identifier 505 (step 307, FIG. 3) to identify the hedge fund being reported, the date of the report, and the version of the report. Report 500 may be divided into four main regions 501, 502, 503 and 504. Each region 501-

504 may include a textual representation of the result data and/or a visual representation of the result date. Although the illustrative representations shown in FIG. 5 are tables and pie-charts, it is understood that the textual and visual representations may take any form appropriate and useful for the display of such information, such as (but not limited to) lists, bar graphs, line graphs, etc.

Region 501 of report 500 illustrates the results of the Existence/Ownership Confirmation processing track 401. Region 501 preferably includes table 501a and visual graph 501b. Both table 501a and visual graph 501b may present the results of the Existence/Ownership Confirmation processing track 401, and may be reported as a proportion or percentage of third party confirmed assets/liabilities compared against the total fund-provided NAV for the fund. Region 501a may also include a listing of internal or external entities responsible for confirming and creating the Custodian/Ownership Data 106. Procedures utilized by these entities in the confirmation and creation of the corroborating data 106 may also be listed to the extent desired.

Region 502 of report 500 illustrates the results of the Price Confirmation processing track 403. Region 502 preferably includes table 502a and visual graph 502b. Both table 502a and visual graph 502b may present the results of the Price Confirmation processing track 403, and may be organized as a proportion or percentage of the sum of third party confirmed values of assets/liabilities compared against the total fund-provided NAV for the fund.

Region 503 of report 500 illustrates the results of the FAS 157 Liquidity Reporting processing track 405. Region 503 preferably includes table 503a and visual graph 503b. Both table 503a and visual graph 503b may present the results of the FAS 157 classifications assigned by the Fund Manager 102, and may be organized as a percentage total of assets/liabilities in each FAS 157 bucket as compared against the total fund-provided NAV for the fund. Region 503 may also include secondary table 503c and graph 503d, which illustrate the side pocket information for the fund.

Region 504 of report 500 illustrates the results of the Custody Reporting processing track 407. Region 504 preferably includes table 504a and visual graph 504b. Both table 504a and visual graph 504b may present the results of the Custodian/Counterparty & Fund Relationship analysis, and may be organized as the total sum of assets/liabilities held by each custodial entity as a percentage of total fund-provided NAV of the fund.

Referring now to FIG. 2, the remaining layers 202 through 210 build on the analysis performed for layer 201. These subsidiary layers of hedge fund confirmation agent system 100 preferably rely on the same data sets used with respect to layer 201, although they may rely more heavily on the fund-provided Portfolio Accounting Data 108. Risk and/or performance data associated with the hedge fund's positions is preferably generated in these subsequent layers 202-210 based at least on an analysis of the hedge fund's books and records data 108. After the calculations are performed for each of the subsequent layers, a customizable report similar to the one described in FIG. 5 may be generated by the Report Generation Process 121 for presentation of the generated risk and/or performance data to the Fund Manager(s) 102 and/or investor(s) 101.

The customizable reports preferably include or are otherwise associated with a reference to the unique identifier (described above), or the unique identifier itself. The inclusion of the unique identifier may serve as a certification that the Confirmation and Qualification process described for the layer 201 analysis above was performed. The inclusion of the unique identifier on subsequent layer reports may demonstrate the estimated reliability of the information contained in the report based on the extent to which the confirmation process was completed, as expressed by the confirmed percentages of NAV provided in the layer 201 report (FIG. 5). The confirmed percentages of NAV may be provided in these subsequent reports for layers 202-210 as an includable text (such as a table), visual graph (such as a pie chart), or both. The unique identifier may also serve as a certification that the layer 201 Confirmation and Qualification process was initiated, and by linking to the layer 201 report (FIG. 5), demonstrate to what extent the layer 201 confirmation process was completed.

The "Asset Risk Analysis" layer 202 of FIG. 2 is preferably responsible for reporting risk or exposure associated with assets in the hedge fund using noted risk factors. Assets are preferably divided into different categories depending on the asset type. These categories may include at least equity products, fixed income products, foreign exchange products and commodities. These categories may be further subdivided. Equity products may, for instance, include at least stocks, options, exchange traded funds, stock futures, equity index futures, index options, convertible bonds. Fixed income products may, for example, include government bonds, agency bonds, municipal bonds, corporate bonds, sovereign bonds, credit derivatives, interest rate derivatives, etc. Foreign exchange products may, for example, include foreign exchange futures, currency forwards, and cross currency forwards. Commodity related products may, for example, include commodity options on futures and commodity futures. Risk or exposure for these products in the disclosed segments may be calculated in accordance with standard industry practice.

The "Asset Return and Relative Returns" layer 203 is preferably responsible for reporting month to date ("MTD"), year to date ("YTD") and inception to date returns on the assets/liabilities in the hedge fund. The MTD, YTD and inception to date fund level returns are calculated and compared with the relevant indices. The calculated fund level return data may be adjusted for risk to calculate risk adjusted return. The actual measures utilized may be, for instance, sharp, beta, alpha correlation, "up-capture" or "down-capture."

The "Sensitivity" layer 204 is preferably responsible for reporting the sensitivity of the assets in the hedge fund. "Greek" sensitivities are preferably utilized. "Delta" is preferably used to measure the rate of change of option value with respect to changes in the underlying asset price. "Vega" may be used to measure volatility, and considers the value of the option against its volatility. Other sensitivities may also be utilized per the requirements of the hedge fund and/or investors.

The "Parallel Shock" layer 205 preferably measures parallel shocks with respect to, for example, equity, equity index, interest rate, credit spreads and volatility. Different shocks may be applied to different asset categories as required. For example, equities may be shock tested by a spread of positive to negative ten percent. Interest rates may utilize a range of positive to negative 100 basis points. Credit spreads may utilize a range of positive to negative ten percent, and volatility may utilize a range of positive to negative twenty percent.

The "Stress Test" layer 206 preferably performs stress tests on the assets within the hedge fund. A stress test effectively estimates the stability of a financial asset under certain circumstances. The hedge fund confirmation agent system 100 preferably utilizes any form of stress test desired by the investors or the hedge fund. These may include historical stresses, event stresses and/or price/volatility shocks. For example, "historical event stresses" may be utilized to calculate an estimate of gain or loss in the current portfolio throughout a variety of historical time periods for equity and equity derivative securities. "Index stresses" are parallel shocks to the portfolio, and may be utilized to approximate the gain loss resulting from movement in certain market indices.

The "Value-at-Risk" ("VAR") layer 207 preferably measures the specific risk of loss on the hedge fund assets or subset of the hedge fund assets. VAR is a statistical measure that helps quantify market risk by indicating the potential maximum loss of a portfolio for a given time horizon and confidence level under normal market conditions. For example, a "1-day VAR" of one million dollars at a 95% confidence level indicates that on 95 out of 100 trading days, the 1-day loss of the portfolio should not exceed one million dollars. The VAR is calculated using a combination of historical market data to capture broad moves in the market, along with a "Monte Carlo" simulation to capture security-specific risk. VAR has additional uses. For example, "incremental VAR" is the sensitivity of a VAR to an incremental change in a position or group of positions. For small changes, the total VAR will change by Incremental VAR multiple by a percentage change in the position. Alternatively, "marginal VAR" is an estimate of the amount the VAR would change if a position or a group of positions was eliminated.

The "Return Attribution" layer 208 measures the performance of the hedge fund portfolio (or a subset thereof) based on specific indicators of portfolio performance. These indices may include asset class, sector, market capitalization, region or the liquidity of the asset (as sorted into distinct categories). The return on the portfolio may be encapsulated as a "fund return," which is a daily time-weighted return. It is computed as gain or loss divided by the net assets at the beginning of the day, adjusted for contributions and withdrawals. A cumulative "fund return" for a set period may be obtained by summing the daily returns via geometric addition, such as $((1+\text{return}_{day1})(1+\text{return}_{day2})-1)^* \ldots$ etc.

The "Profit and Loss" layer 209 analyzes the overall performance of the hedge fund portfolio with respect to profits earned and losses sustained by the hedge fund during the period in question. P&L metrics associated with the hedge fund may be performed based on corroborating Market Price Data 107 received from an independent third party.

The "Concentration Analysis" layer 210 preferably creates a concentration analysis of the hedge fund portfolio. After a delta adjusted exposure as percentage of NAV is calculated, assets may be grouped into positions (i.e., long and short), and then the highest exposures for each position may be detailed for viewing by the investor or hedge fund. For instance, the top ten long exposures may be listed, followed by the top ten short exposures. This is preferably followed by the top contributors to profit and loss. The data may be presented in other ways as well. For instance, a top set of instruments that have gone from loss to profit (and vice versa) for the current period may be displayed in order of magnitude of loss to profit change.

Figure 6:
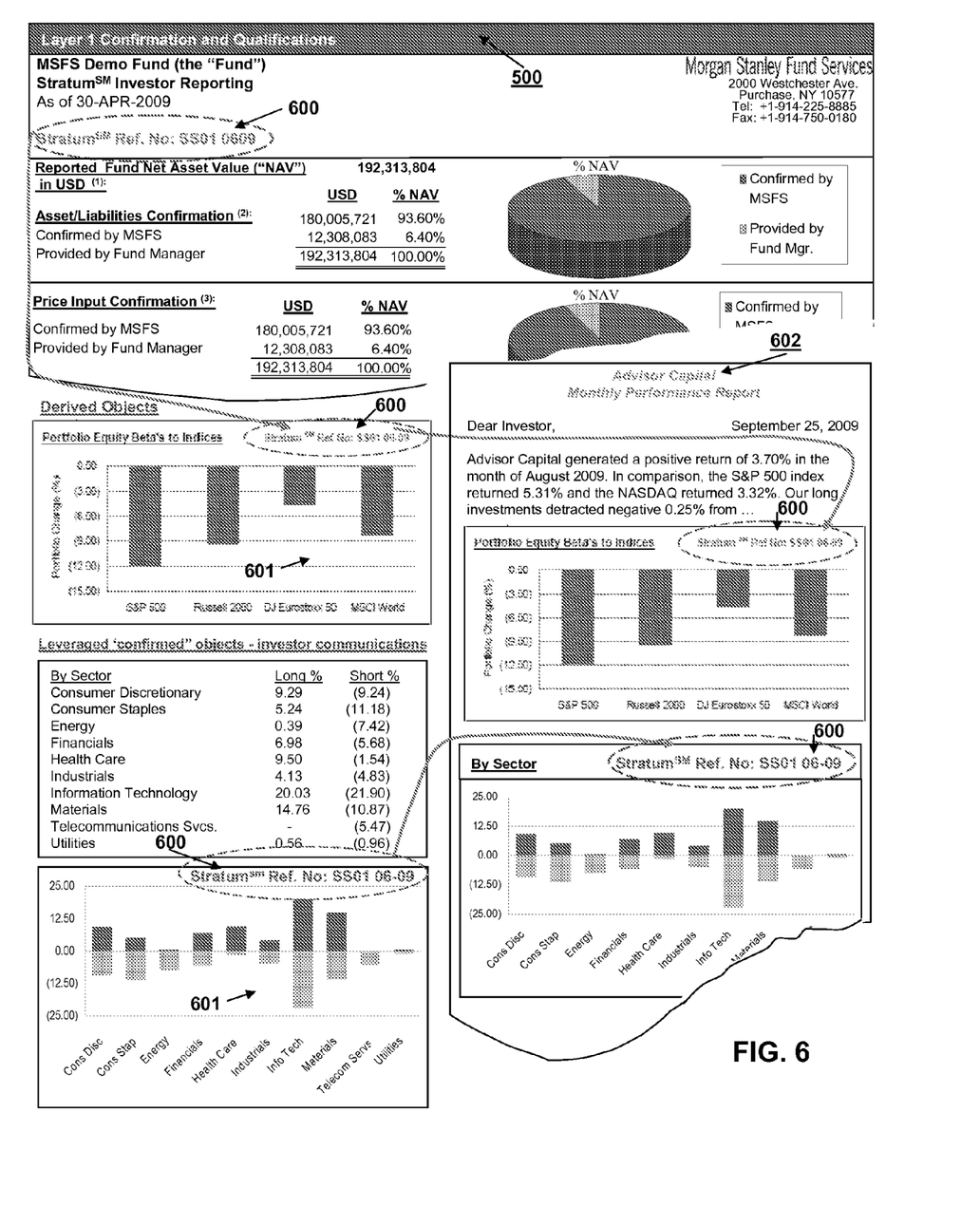
FIG. 6 illustrates how a unique identifier may be leveraged across multiple hedge fund confirmation layer reports to certify that the confirmation analysis has been conducted.

FIG. 6 is an illustration demonstrating how the unique identifier 600 may be leveraged across multiple hedge fund confirmation layer reports. All reports generated by the hedge fund confirmation agent system 100 preferably include or are otherwise associated with a reference to the unique identifier 600. Layer 201 Asset Confirmation and Qualification report 500 includes a reference to the unique identifier 600. The subsequent subsidiary layer 202-210 reports 601 and final client report 602 also include a reference to the unique identifier 600 as a certification that the layer 201 Asset Confirmation and Qualification process was performed.

Moreover, by linking the subsequent reports to the original Layer 201 Asset Confirmation and Qualification report 500 via the unique identifier 600, an investor 101 may readily ascertain the reliability of the subsequent layer 202-210 reporting. For example, if the layer 201 report 500 associated with the unique identifier 600 listed on a layer 202-210 report indicates that 99% of the assets, liabilities and instruments in the fund were confirmed, an investor 101 that receives the report(s) may adjudge that the subsequent layer 202-210 reporting has a high degree of reliability in reflecting the current state of the hedge fund portfolio. However, if the layer 201 report 500 associated with the unique identifier 600 indicates that only 50% of the assets, liabilities and instruments in the fund were confirmed, the investor 101 may adjudge that the subsequent layer 202-210 reporting has a lesser degree of reliability, because much of the information is based on unconfirmed information provided directly from the Fund Manager 103.

As discussed above, the hedge fund confirmation agent system 100 may be implemented utilizing one or more computing systems 103, 106 of varying configurations. For instance, computing systems 103, 106 may be combined as a single computing system. Each computing system preferably includes computing components for executing computer program instructions and processes. These components may include a central processing unit (CPU), memory, input/output (I/O) devices, and a network interface.

The CPU processes and executes computer program instructions. Random access memory (RAM) and/or fast access cache memory preferably provides fast data supply to CPU. Long-term storage may be provided as a more permanent form of computer memory, and may be, for example, a hard disk, optical disk, flash memory, solid-state memory, tape, or any other type of memory.

The I/O device(s) permit human interaction with the computer system, such as (but not limited to) a mouse, keyboard and computer display. I/O device(s) may also include other interactive devices, such as (but not limited to) touch screens, digital stylus, voice input/output, etc.

The network interface device may provide the computing system with access to a network, which may be a wireless or wired connection. The network may be, for example, the Internet, a corporate intranet, or any other computer network through which computing system may connect to or otherwise communicate with other computers and databases, such as (but not limited to) Portfolio Accounting database 110, General Reconciliation database 112 and other databases. Portfolio Accounting Database 110, General Reconciliation Database 112 and the other databases represent other computerized systems or databases for specialized information that may be necessary for implementation of the hedge fund confirmation agent system 100.

Software process or processes and executables (such as processes 113, 114, 121 and 122) on the computing system may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A computer-implemented method for confirmation of hedge fund information, comprising:

storing in memory a list of asset and liability positions of a hedge fund and a fund-provided market value of each position;

storing in memory corroborating data received from a third party independent of the hedge fund, the corroborating data including information beyond transaction data and confirming the existence of at least one position of the hedge fund;

performing an asset and liability position confirmation, using a computer processor, by comparing the corroborating data to the list of asset and liability positions to identify third party confirmed positions of the hedge fund that correspond to the corroborating data;

calculating, using a computer processor, a total market value of third party confirmed positions based upon the fund-provided market value of each third party confirmed position;

storing in memory third party market values for asset and liability positions of the hedge fund, wherein the third party market values are provided by a third party independent of the hedge fund and are derived from data including information beyond transaction data;

performing a price input confirmation, using a computer processor, by comparing the stored fund-provided market value of each position to the stored third party market value of the position wherein the fund-provided market value of each position is identified as a confirmed market value when the fund-provided market value falls within a predefined threshold of the stored third party market value of the position;

calculating, using a computer processor, a total confirmed market value of asset and liability positions based upon the identified confirmed market values;

generating a unique identifier, using a computer processor, and assigning the unique identifier to a confirmation instance, wherein the confirmation instance is the performed asset and liability position confirmation and the price input confirmation;

generating, using a computer processor, a report that identifies (A) a first proportion of a net asset value of the hedge fund attributable to the total market value of third party confirmed positions that is based on confirmed positions, wherein the first proportion corresponds to the relative amount of the total market value of third party confirmed positions to the net asset value and (B) a second proportion of the net asset value attributable to the total confirmed market value of asset and liability positions, wherein the second proportion corresponds to the relative amount of the total confirmed market value of positions to the net asset value and associating, using a computer processor, the unique identifier to the generated report;

generating at least one of risk and performance data associated with the hedge fund's positions based at least on an analysis of the hedge fund's books and records data; and generating, using a computer processor, a second report that identifies the generated at least one of risk and performance data, and associating, using a computer processor, the unique identifier to the second report, wherein the second report includes the unique identifier to link the generated reports and certify that the asset and liability position confirmation and the price input confirmation have been performed.

2. The computer-implemented method of claim 1, wherein the first proportion is the ratio of the calculated total value third party confirmed positions over the net asset value of the hedge fund using the fund-provided market values.

3. The computer-implemented method of claim 1, wherein the second proportion is the ratio of the calculated total confirmed market value of positions over the net asset value of the hedge fund using fund-provided market values.

4. The computer-implemented method of claim 1, further comprising:
   storing in memory information grouping the asset and liability positions of the hedge fund into liquidity levels; and
   calculating, using a computer processor, a total market value of asset and liability positions within each liquidity level, wherein the generated report identifies a proportion of the net asset value of the hedge fund that is grouped in each liquidity level.

5. The computer-implemented method of claim 1, further comprising:
   storing in memory corroborating data received from a third party independent of the fund confirming a custodial arrangement of the asset and liability positions; and
   calculating, using a computer processor, a total market value of asset and liability positions held by each custodial entity, wherein the generated report identifies a proportion of the net asset value of the hedge fund that is held by each custodial entity.

6. A system for confirmation of hedge fund information, the system comprising:
   a computer processor; and
   memory comprising program instructions, wherein the program instructions are executable by the computer processor to:
     store in memory a list of asset and liability positions of a hedge fund and a fund-provided market value of each position;
     store in memory corroborating data received from a third party independent of the hedge fund, the corroborating data including information beyond transaction data and confirming the existence of at least one position of the hedge fund;
     perform an asset and liability position confirmation, using a computer processor, by comparing the corroborating data to the list of asset and liability positions to identify third party confirmed positions of the hedge fund that correspond to the corroborating data;
     calculate, using a computer processor, a total market value of third party confirmed positions based upon the fund-provided market value of each third party confirmed position;
     store in memory third party market values for asset and liability positions of the hedge fund, wherein the third party market values are provided by a third party independent of the hedge fund and are derived from data including information beyond transaction data;
     perform a price input confirmation, using a computer processor, by comparing the stored fund-provided market value of each position to the stored third party market value of the position wherein the fund-provided market value of each position is identified as a confirmed market value when the fund-provided market value falls within a predefined threshold of the stored third party market value of the position;
     calculate, using a computer processor, a total confirmed market value of asset and liability positions based upon the identified confirmed market values;
     generate a unique identifier, using a computer processor, and assigning the unique identifier to a confirmation instance, wherein the confirmation instance is the performed asset and liability position confirmation and the price input confirmation;
     generate, using a computer processor, a report that identifies (A) a first proportion of a net asset value of the hedge fund attributable to the total market value of third party confirmed positions that is based on confirmed positions, wherein the first proportion corresponds to the relative amount of the total market value of third party confirmed positions to the net asset value and (B) a second proportion of the net asset value attributable to the total confirmed market value of asset and liability positions, wherein the second proportion corresponds to the relative amount of the total confirmed market value of positions to the net asset value and associating, using a computer processor, the unique identifier to the generated report;
     generate at least one of risk and performance data associated with the hedge fund's positions based at least on an analysis of the hedge fund's books and records data; and
     generate, using a computer processor, a second report that identifies the generated at least one of risk and performance data, and associating, using a computer processor, the unique identifier to the second report, wherein the second report includes the unique identifier to link the generated reports and certify that the asset and liability position confirmation and the price input confirmation have been performed.

7. The system of claim 6, wherein the first proportion is the ratio of the calculated total value third party confirmed positions over the net asset value of the hedge fund using the fund-provided market values.

8. The system of claim 6, wherein the second proportion is the ratio of the calculated total confirmed market value of positions over the net asset value of the hedge fund using fund-provided market values.

9. The system of claim 6, wherein the program instructions are further executable by the computer processor to:
   storing in memory information grouping the asset and liability positions of the hedge fund into liquidity levels; and
   calculating, using a computer processor, a total market value of asset and liability positions within each liquidity level, wherein the generated report identifies a proportion of the net asset value of the hedge fund that is grouped in each liquidity level.

10. The system of claim 6, wherein the program instructions are further executable by the computer processor to:
    storing in memory corroborating data received from a third party independent of the fund confirming a custodial arrangement of the asset and liability positions; and
    calculating, using a computer processor, a total market value of asset and liability positions held by each custodial entity, wherein the generated report identifies a proportion of the net asset value of the hedge fund that is held by each custodial entity.

* * * * *